United States Patent
Kang et al.

(10) Patent No.: US 8,154,504 B2
(45) Date of Patent: Apr. 10, 2012

(54) LIQUID CRYSTAL DISPLAY DEVICE CAPABLE OF AUTOMATICALLY SWITCHING TO A MODE AND METHOD FOR DRIVING THE SAME

(75) Inventors: Hee Kwang Kang, Seoul (KR); Kyo Seop Choo, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 987 days.

(21) Appl. No.: 11/638,386

(22) Filed: Dec. 14, 2006

(65) Prior Publication Data
US 2007/0153157 A1 Jul. 5, 2007

(30) Foreign Application Priority Data
Dec. 30, 2005 (KR) .................. 10-2005-0135585

(51) Int. Cl.
*G09G 3/36* (2006.01)
*G09G 5/00* (2006.01)
(52) U.S. Cl. ........................ 345/102; 345/207
(58) Field of Classification Search ............ 345/87, 345/102, 207; 348/602; 349/42, 44, 111
See application file for complete search history.

(56) References Cited

U.S. PATENT DOCUMENTS

| | | | | |
|---|---|---|---|---|
| 6,447,132 B1* | 9/2002 | Harter, Jr. ................. 362/29 |
| 6,710,831 B1* | 3/2004 | Winker et al. ............. 349/115 |
| 7,218,048 B2* | 5/2007 | Choi et al. ................ 313/504 |
| 7,589,305 B2* | 9/2009 | Kunimori et al. .......... 250/208.1 |
| 2003/0210221 A1* | 11/2003 | Aleksic ..................... 345/102 |
| 2003/0231161 A1* | 12/2003 | Yamaguchi ................ 345/102 |
| 2004/0227719 A1* | 11/2004 | Chang et al. .............. 345/102 |
| 2005/0110742 A1* | 5/2005 | Arakawa ................... 345/102 |
| 2005/0140641 A1* | 6/2005 | Kim et al. ................. 345/102 |
| 2005/0231457 A1* | 10/2005 | Yamamoto et al. ......... 345/102 |
| 2005/0275616 A1* | 12/2005 | Park et al. ................ 345/102 |
| 2006/0022934 A1* | 2/2006 | Whitted et al. ............ 345/102 |
| 2006/0192749 A1* | 8/2006 | Lowles et al. ............. 345/102 |
| 2006/0202947 A1* | 9/2006 | Lee .......................... 345/102 |
| 2007/0146296 A1* | 6/2007 | Kang et al. ................ 345/102 |
| 2007/0279369 A1* | 12/2007 | Yao et al. .................. 345/102 |
| 2008/0055519 A1* | 3/2008 | Battersby et al. ........... 349/68 |
| 2008/0284716 A1* | 11/2008 | Edwards et al. ............ 345/102 |

* cited by examiner

*Primary Examiner* — Sumati Lefkowitz
*Assistant Examiner* — Rodney Amadiz
(74) *Attorney, Agent, or Firm* — McKenna Long & Aldridge, LLP

(57) ABSTRACT

A liquid crystal display device includes a liquid crystal display panel, a backlight unit, a first sensor, and a second sensor. The liquid crystal display panel includes a first substrate divided into a display region and a non-display region including a first region and a second region, a liquid crystal layer, and a second substrate. The backlight unit is disposed opposite a surface of the first substrate to emit light onto the liquid crystal display panel. The first sensor is disposed in the first region to sense ambient light, and the second sensor is disposed in the second region to sense light emitted from the backlight unit.

12 Claims, 7 Drawing Sheets

LIGHT FROM BACKLIGHT UNIT

LIQUID CRYSTAL DISPLAY DEVICE CAPABLE OF AUTOMATICALLY SWITCHING TO A MODE AND METHOD FOR DRIVING THE SAME

This application claims the benefit of Korea Patent Application No. 10-2005-135585, filed on Dec. 30, 2005, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device capable of automatically switching to a transmission mode or a reflection mode, and a method for driving the same.

2. Discussion of the Related Art

The cathode ray tube (CRT) is widely used as a display device. While cathode ray tube based displays are commonly used as the monitors for information terminal apparatuses, because of their size and weight, CRT based displays are not well suited to address the current trends for miniaturization and lightweight trends for electronic products.

Displays using liquid crystal display (LCD) devices have advantages of light weight, low power consumption, and slim profile when compared to CRT displays. In particular, displays employing LCD devices using thin film transistors (TFTs) having high image quality, large sizes, and color display capability nearly equal to that of a CRT are widely used in a variety of applications including monitors and the displays of notebook personal computers (PCs).

The LCD device is a transmissive display device and controls an amount of light passing through a liquid crystal (LC) layer using anisotropy in a refractive index of LC molecules contained in the LC layer to display a desired image on a screen. A typical LCD device may include a backlight unit to provide light for transmitting through the LC layer in order to display pixels of an image. Such a LCD device can be roughly divided into an LC display panel and a backlight unit provided at the rear of the LC display panel.

The LC display panel is the portion of an LCD device on which the image is realized and includes a lower substrate, an upper substrate, and an LC layer interposed between the two substrates. The lower substrate includes a driving device such as a TFT and a pixel electrode. The upper substrate includes a color filter layer and a common electrode. A driving circuit unit is provided on a lateral side of the lower substrate to apply signals to the TFT, the pixel electrode, and the common electrode formed on the lower substrate, respectively.

The backlight unit includes a light source for emitting light, a reflector for reflecting light generated from the light source to improve a light efficiency, and optical sheets for diffusing and condensing the light.

LCD devices are roughly classified into transmission type LCD devices displaying an image using light incident from a backlight unit, and reflection type LCD devices displaying an image by reflecting external light such as natural light. The transmission type LCD device has the disadvantage that power consumption of the backlight unit is large. Meanwhile, the reflection type LCD device has the disadvantage that an image cannot be displayed in dark environments because the reflection type LCD device depends on ambient light to display images.

To address these problems, a transflective LCD device has been developed which can selectively operate in either a transmission mode using a backlight unit or in a reflection mode using external light. Because the transflective LCD device operates in a reflection mode when ambient light is sufficient and operates in a transmission mode using a backlight unit when the ambient light is not sufficient, transflective LCD devices may have reduced power consumption compared to the transmission type LCD device and are not limited by external light conditions as is the reflection type LCD device.

In a related art transflective LCD device, a user judges the amount of ambient light and selects a reflection mode or a transmission mode. Therefore, the transflective LCD device may be operated in the reflection mode when the amount of ambient light is not sufficient, and may be operated in the transmission mode when the amount of ambient light is sufficient. With a transflective LCD device in which the mode is selected by a user, the user may not accurately judge the amount of external light and light from the backlight unit. Accordingly the user may select the reflection mode even when the amount of ambient is not sufficient for proper viewing of the display, or may select the transmission mode even though there is a sufficient amount of ambient external light is sufficient for producing a quality display without reducing the display quality of the transflective LCD device.

SUMMARY OF THE INVENTION

Accordingly, the present invention is directed to a liquid crystal display device and a method for driving the same that substantially obviate one or more problems due to limitations and disadvantages of the related art.

An advantage of the present invention is to provide an LCD device and a method for driving the same that provides a first light sensor for detecting ambient light and a second light sensor for detecting light from a backlight unit to control a mode of operation of the LCD device.

Additional features and advantages of the invention will be set forth in part in the description which follows, and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, there is provided a liquid crystal display device including a liquid crystal display panel including a first substrate divided into a display region and a non-display region including a first region and a second region, a liquid crystal layer, and a second substrate; a backlight unit disposed opposite a surface of the first substrate to emit light onto the liquid crystal display panel; a first sensor disposed in the first region to sense ambient light; and a second sensor disposed in the second region to sense light emitted from the backlight unit.

In another aspect of the present invention, a method for driving a liquid crystal display device includes: sensing ambient light and light emitted from a backlight unit using a first sensor and a second sensor, respectively, the first and second sensors on a first region and a second region of a non-display region of a substrate; comparing an output of the first sensor with an output of the second sensor to generate a comparison result; and controlling the backlight unit according to the comparison result.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, an example of which is illustrated in the accompanying drawings.

Figure 1A:
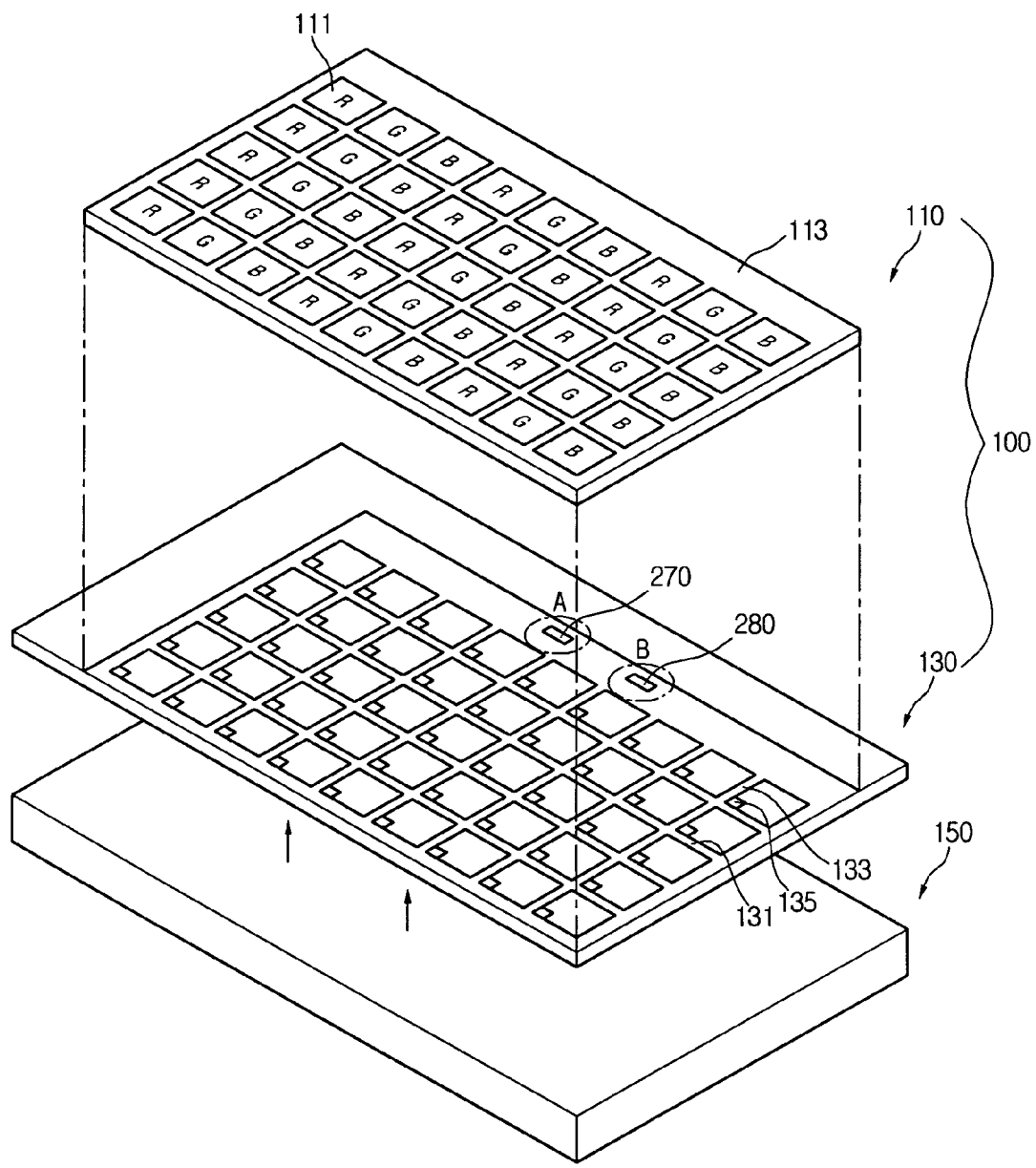
FIG. 1A is an exploded perspective view illustrating a transflective liquid crystal display device according an embodiment of the present invention.
Figure 1B:
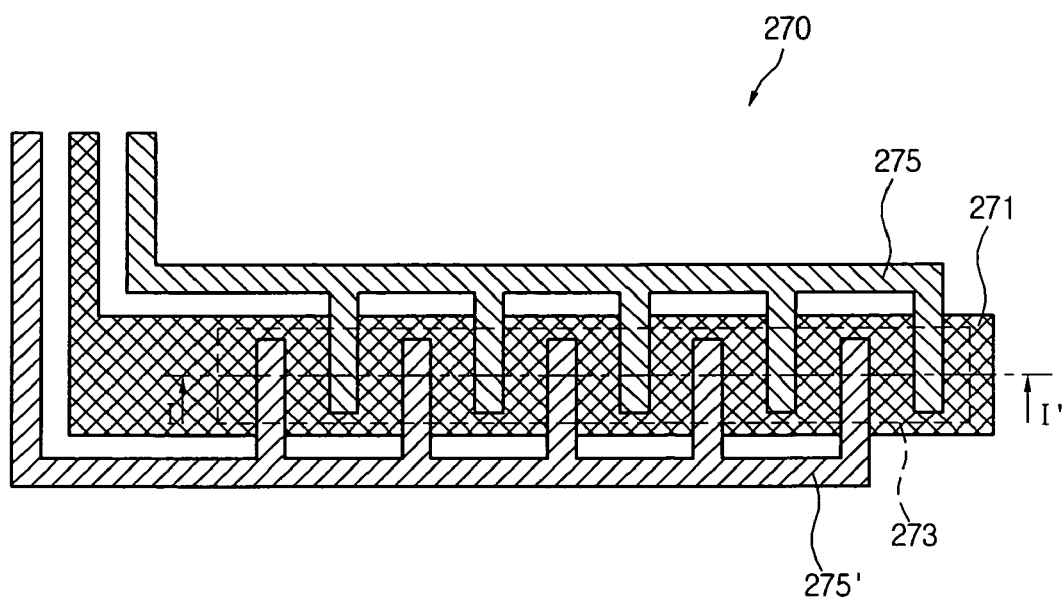
FIG. 1B is a detailed view illustrating a portion A of FIG. 1A.
Figure 1C:
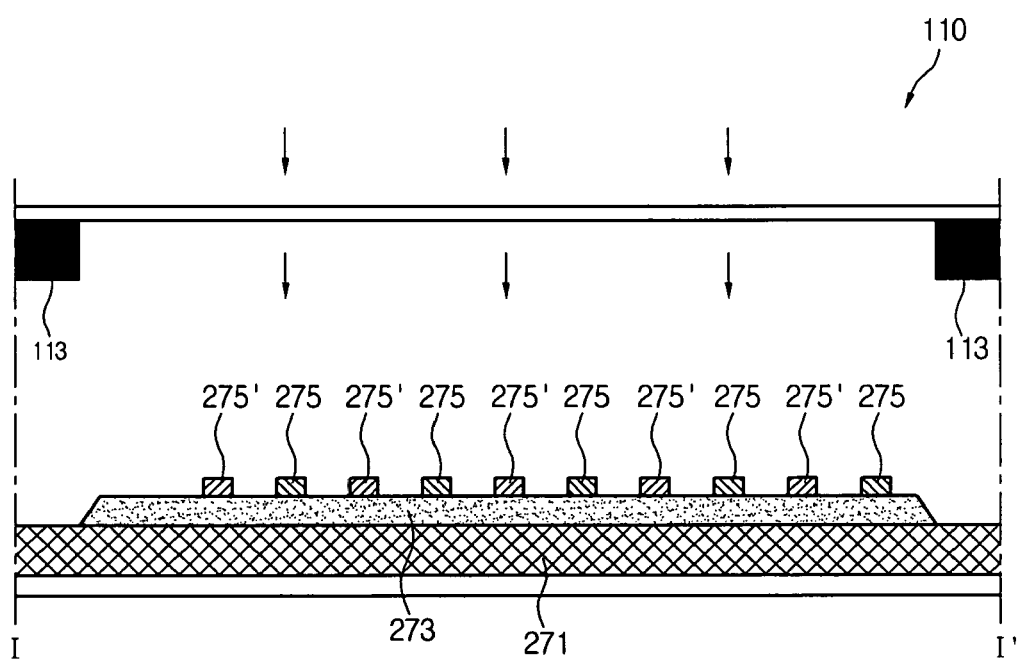
FIG. 1C is a cross-sectional view taken along the line I-I' of FIG. 1B.
Figure 1D:
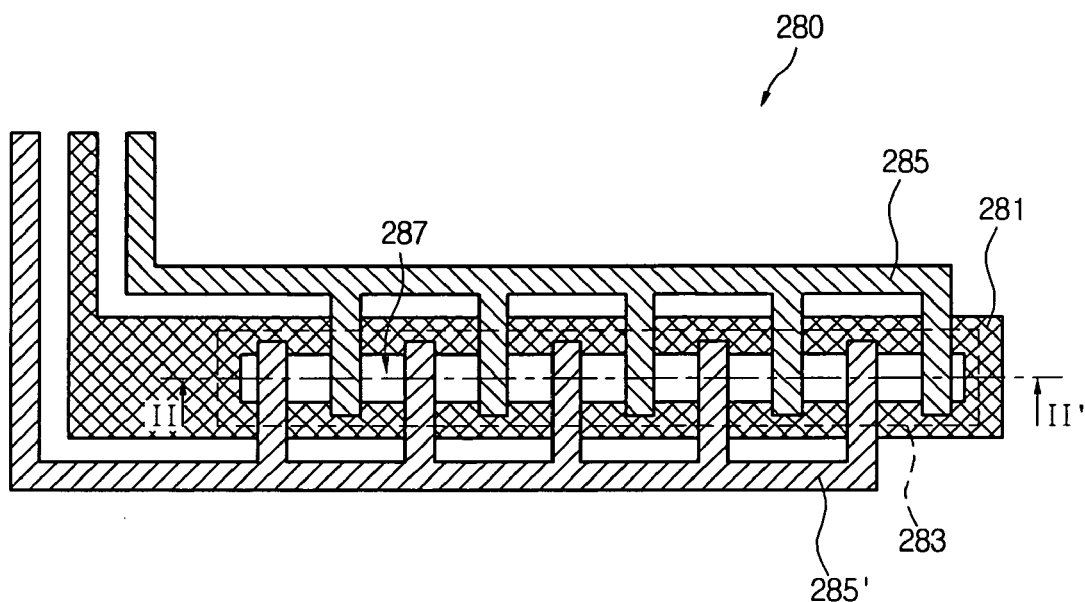
FIG. 1D is a detailed view illustrating a portion B of FIG. 1A.
Figure 1E:
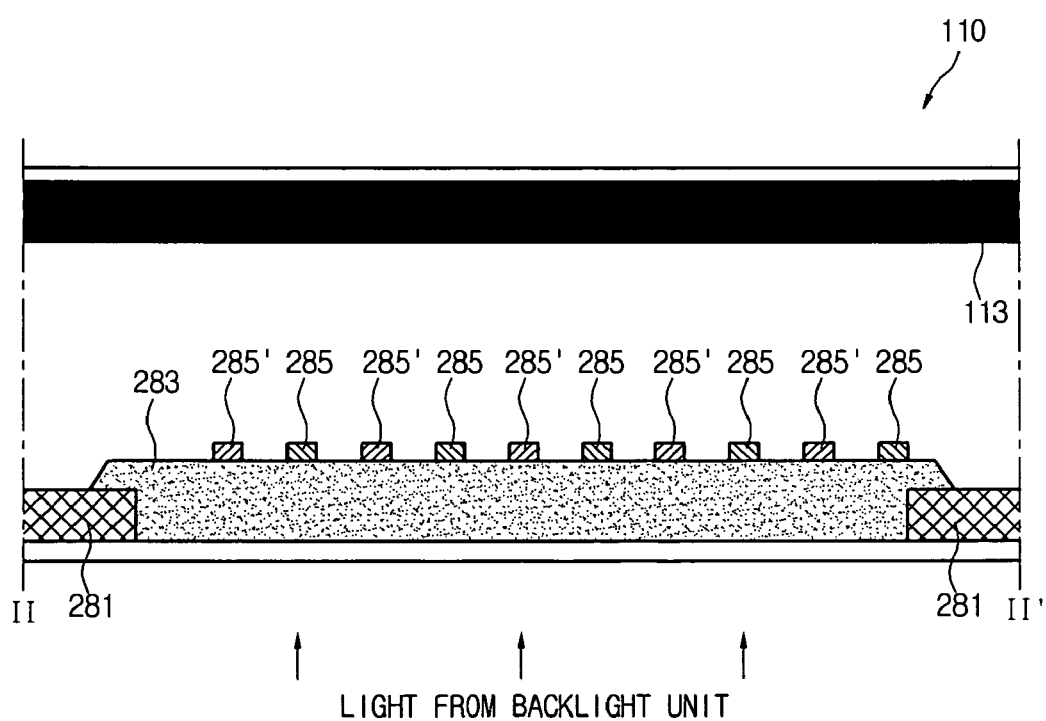
FIG. 1E is a cross-sectional view taken along the line II-II' of FIG. 1D.

FIG. 1A is an exploded perspective view illustrating a transflective liquid crystal display device according to an embodiment of the present invention, FIG. 1B is a detailed view illustrating a portion A of FIG. 1A, FIG. 1C is a cross-sectional view taken along the line I-I' of FIG. 1B, FIG. 1D is a detailed view illustrating a portion B of FIG. 1A, and FIG. 1E is a cross-sectional view taken along the line II-II' of FIG. 1D.

Referring to FIGS. 1A to 1E, the transflective LCD includes a liquid crystal (LC) display panel 100 for displaying an image, and a backlight unit 150 for illuminating light onto the LC display panel 100.

The LC display panel 100 includes an upper substrate 110 and a lower substrate 130 facing each other with an LC layer interposed therebetween. The LC display panel 100 is divided into a display region for realizing an image, and a non-display region disposed on an outer block of the LC display panel 100 blocking the transmission of light.

The upper substrate 110 is a color filter substrate. Red, Green, and Blue (R, G, and B) Color filters 111 for realizing colors are formed in pixel regions of the upper substrate 110 and a black matrix (BM) 113 for preventing light leakage is formed in a BM region of the upper substrate 110. The BM 113 is formed in boundary regions between pixels to prevent light leakage between the pixels. The color filter 111 may be a resin layer including dye or pigment. An overcoat layer for planarizing the color filter 111 may be formed on the color filter 111. A common electrode is formed on the overcoat layer to receive a voltage for generating an electric field in the LC layer.

A plurality of gate lines 131 and data lines 133 are arranged to cross perpendicularly on the lower substrate 130 to define pixels. Switching devices for controlling pixels are formed at crossings of gate lines 131 and data lines 133. The switching devices are thin film transistors (TFTs) 135. Each TFT 135 includes a gate electrode, a semiconductor layer, and source/drain electrodes. A gate pad and a data pad for applying signals are formed on one side of each of the gate lines 131 and the data lines 133, respectively. A pixel electrode corresponding to the common electrode is formed in each pixel. A reflective electrode for reflecting ambient light from the surroundings is formed on the pixel electrode. The common electrode and the pixel electrode are formed of a transparent conductive material such as indium tin oxide (ITO) and indium zinc oxide (IZO).

A first light sensor 270 for sensing brightness of the surrounding environment, and a second light sensor 280 for sensing light from the backlight unit 150 are formed on the lower substrate at one side of the non-display region in an area corresponding to the BM 113.

The first light sensor 270 formed on the lower substrate 130 includes a first gate electrode 271, a first semiconductor layer 273, and first source/drain electrodes 275 and 275'. The second light sensor 280 includes a second gate electrode 281, a second semiconductor layer 283, and second source/drain electrodes 285 and 285'. The first and second semiconductor layers 273 and 283 are formed of amorphous silicon.

The first and second light sensors 270 and 280 may be formed simultaneously or concurrently with the forming of the pixel switching device (i.e., TFT) so that a separate process for forming the first and second light sensors 270 and 280 may be omitted.

An opening is formed in the BM 113 on the upper substrate 110 corresponding to the first light sensor 270 to allow the first light sensor to receive external light. The opening may be formed by removing a portion of the BM 113.

A case top for fixing and enclosing a potion of the LC display panel 100 excluding the display region of the LC display panel 100 may be disposed on the LC display panel 100. A predetermined hole may be formed in a portion of the case top corresponding to the first light sensor 270 to allow ambient light from the environment of the LC display panel to reach the first light sensor 270.

Meanwhile, the BM 113 of the upper substrate 110 blocks the path of external or ambient light to the second light sensor 280 to prevent the second light sensor 280 from receiving ambient light. An opening is formed in the second gate electrode 281 of the second light sensor 280 to allow the second light sensor 280 to receive light from a backlight unit 150 located opposite a rear surface of the lower substrate 130.

The backlight unit 150 includes a light source to emit light, and optical sheets disposed opposite the light source to diffuse and condense light.

The first and second semiconductor layers 273 and 283 may be formed of amorphous silicon having an energy band structure sensitive to light energy.

Figure 2A:
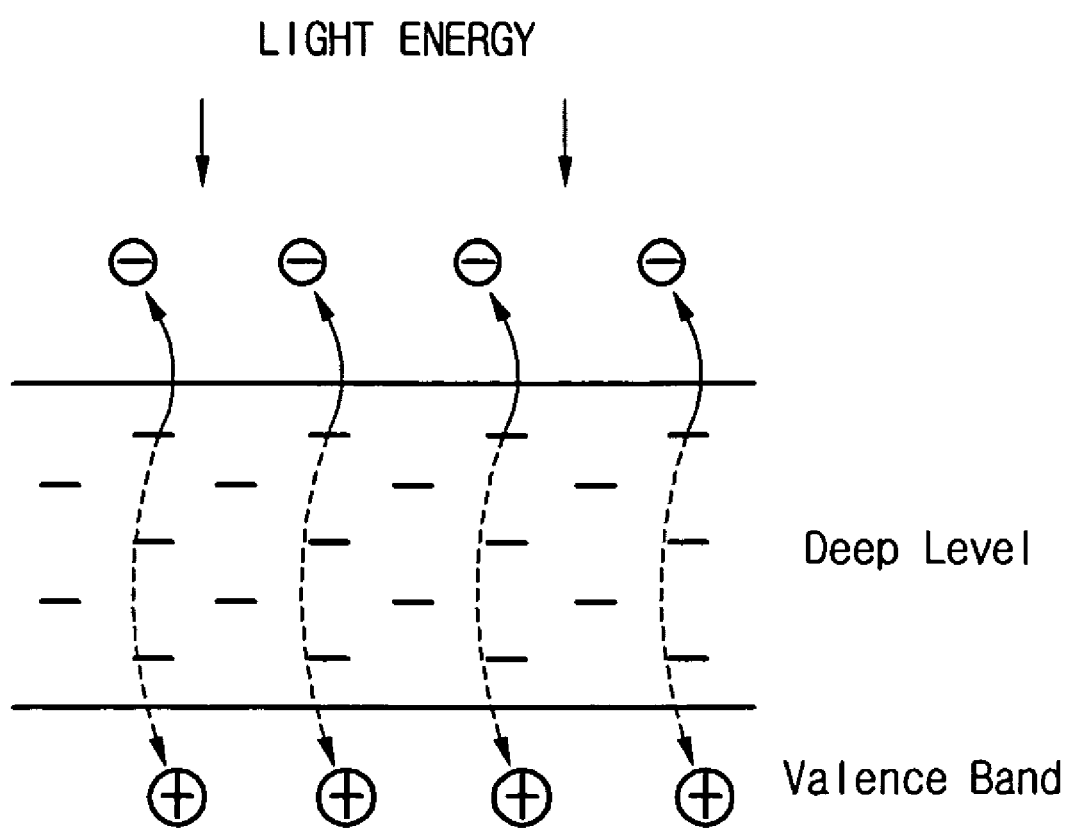
FIGS. 2A to 2C are views illustrating an energy band structure of a semiconductor layer according to an embodiment of the present invention.
Figure 2B:
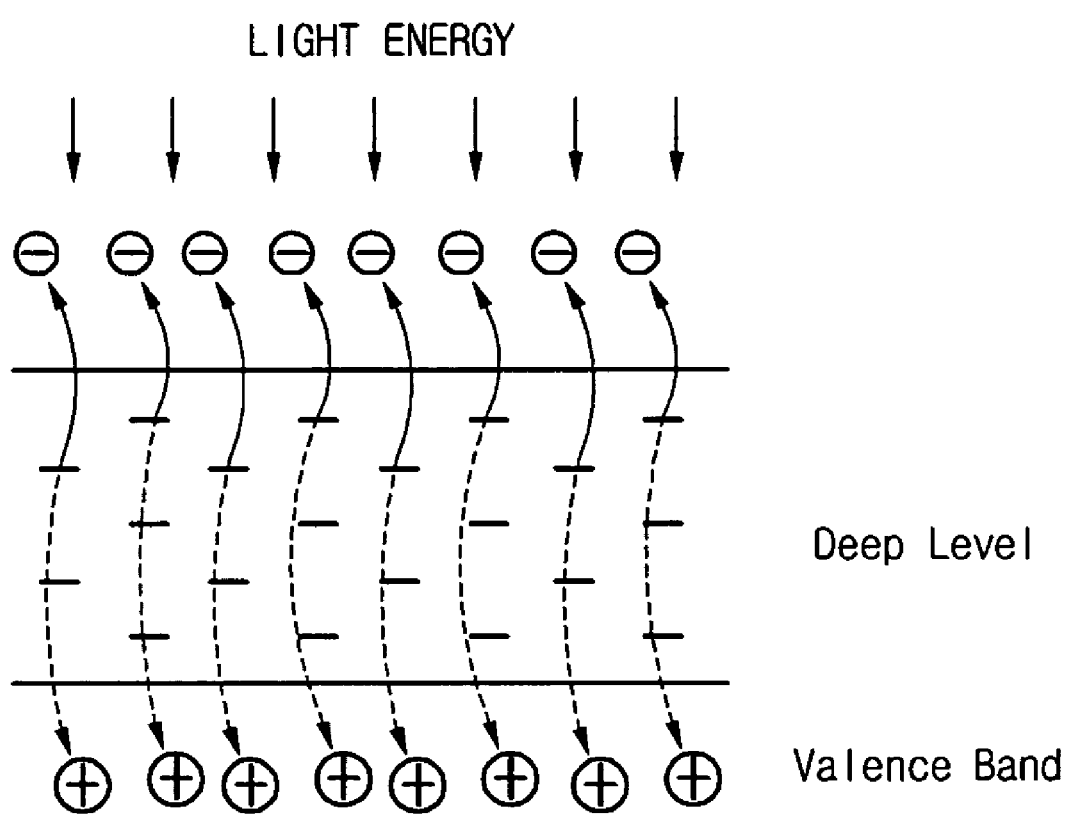
Figure 2C:
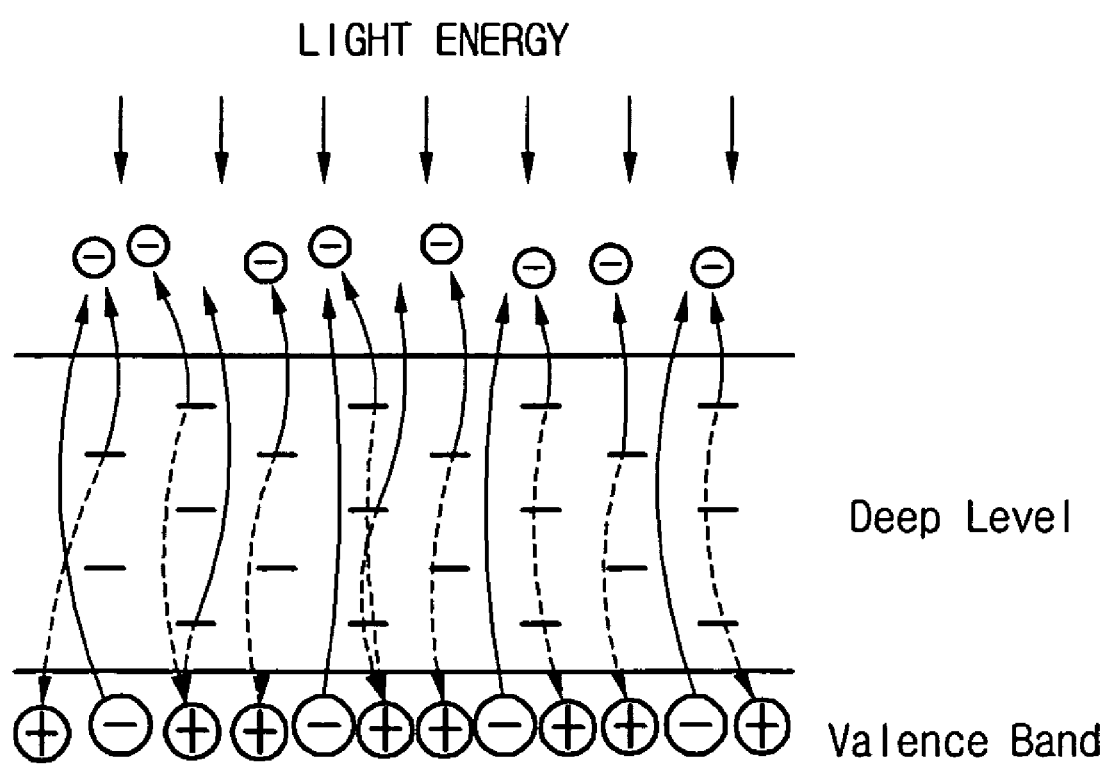

FIGS. 2A to 2C illustrate an energy band structure of a semiconductor layer according to an embodiment of the present invention.

Referring to FIGS. 2A to 2C, energy band structures of the first and second semiconductor layers 273 and 283 of FIGS. 1B and 1D have a band gap located between a conduction band and a valence band. When light of energy greater than a band gap is incident on a semiconductor layer 273 or 283, electrons are excited from the valence band to the conduction band. When an electric field is applied to a semiconductor having electrons excited into the conduction band, the electrons move in the direction of the electric field direction resulting in a current flow.

The first and second semiconductor layers 273 and 283 (FIGS. 1B and 1D) are formed of amorphous silicon having a large number of deep levels caused by impurities between band gaps making the first and second semiconductor layers 273 and 283 very sensitive to light energy.

Referring to FIG. 2A, when light energy is illuminated onto amorphous silicon, electrons in the deep level located closely to the conduction band are excited. As the intensity of light energy is increased, electrons in the deep levels in the band gap move to the conduction band and the intensity of the current increases as illustrated in FIG. 2B. When the intensity of the light energy is further increased and light having energy of more than the band gap is illuminated, electrons located in the valence band are excited into the conduction band, and the intensity of the current increases in proportion to the intensity of the light energy as illustrated in FIG. 2C.

Referring to FIGS. 1A to 1E, the first and second light sensors 270 and 280 use characteristics of the above-described semiconductor. When intensity of light energy is high, the intensity of a current flowing through the first and second source/drain electrodes 275, 275', 285, and 285' increases. On the other hand, when intensity of light energy is low, the intensity of the current flowing through the first and second source/drain electrodes 275, 275', 285, and 285' decreases. Therefore, the first and second light sensors 270 and 280 may be used to judge the intensity of external light or light from the backlight unit 150 based on the intensity of a current flowing through the first and second source/drain electrodes 275, 275', 285, and 285' to control the backlight unit 150.

Figure 3:
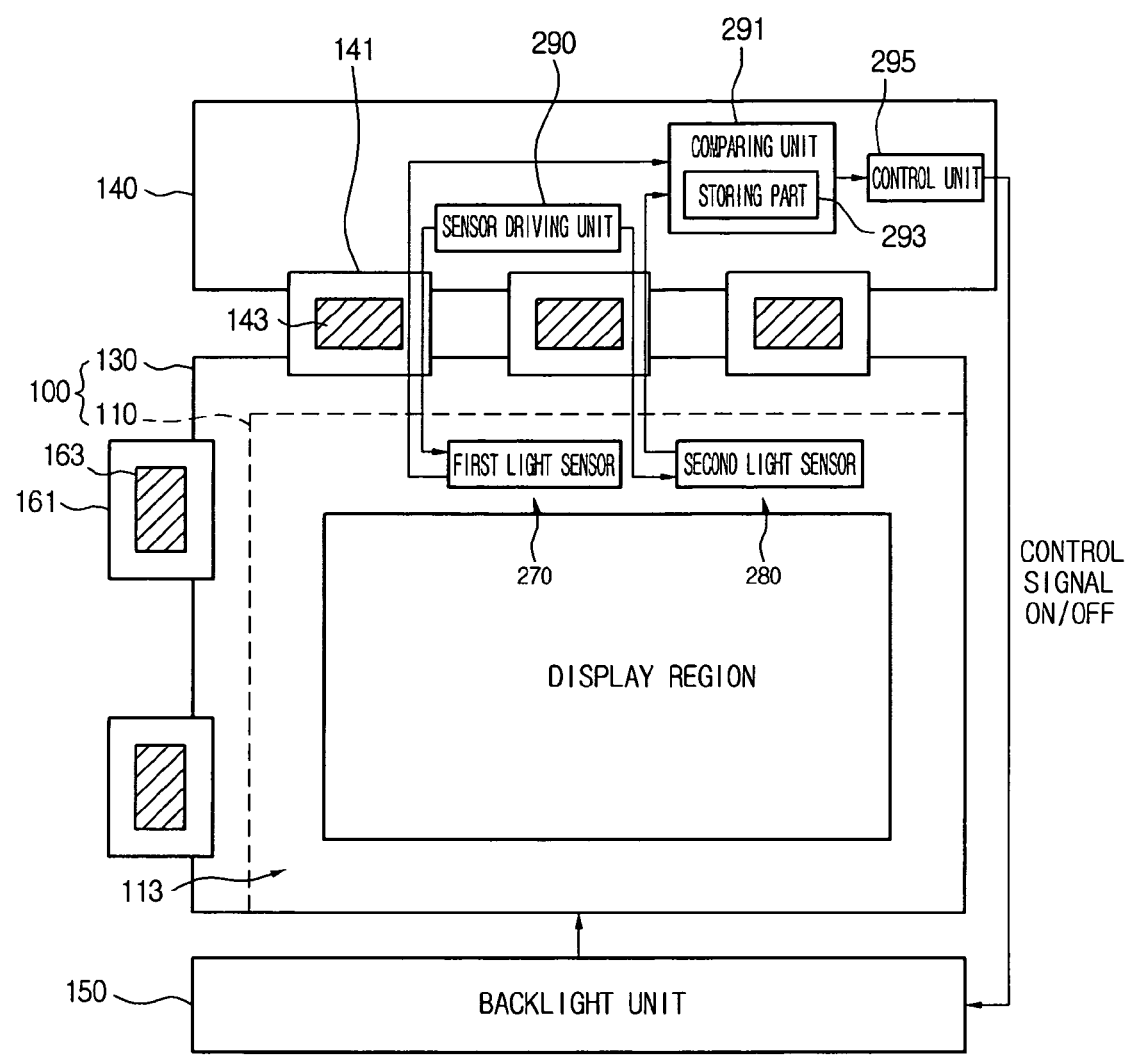
FIG. 3 is a plan view of a liquid crystal display device according to an embodiment the present invention.

FIG. 3 illustrates liquid crystal display device including a driver for light sensors according to an embodiment of the present invention.

Referring to FIGS. 1A to 1E, and 3, the LCD device includes an LC display panel 100, a plurality of data tape-carrier packages (TCPs) 141 connected between the LC display panel 100 and a data printed circuit board (PCB) 140, a plurality of gate TCPs connected on one side of the LC display panel 100, data driver integrated circuits (ICs) 143 each mounted in a respective data TCP 141, gate driver ICs 163 each mounted in a respective gate TCP 161, and a backlight unit 150 for emitting light onto the LC display panel 100.

The LC display panel 100 includes a lower substrate 130 and an upper substrate 110 each formed of a transparent insulating substrate, and a LC layer interposed between the lower substrate 130 and the upper substrate 110.

A BM 113 for blocking light is formed on an edge region of the upper substrate 100.

A first light sensor 270 for sensing light external to the LCD device and a second light sensor 280 for sensing light from the backlight unit 150 are provided on one side of the lower substrate 130.

The first light sensor 270 includes a first gate electrode 271, a first semiconductor layer 273, and first source/drain electrodes 275 and 275'.

A portion of the BM 113 of the upper substrate 110 corresponding to the first light sensor 270 is removed or omitted to allow external light to be incident onto the first light sensor 270.

The second light sensor 280 includes a second gate electrode 281, a second semiconductor 283, and second source/drain electrodes 285 and 285'.

The second gate electrode 281 of the second light sensor 280 has a hole or opening 287 formed along a lengthwise direction in a central region of the lower substrate 130 to allow light from a backlight unit 150 disposed at a rear side of the second light sensor 280 to be incident onto the second light sensor 280. The BM 113 is formed on the upper substrate 110 including the portion corresponding to the second light sensor 280 such that external or ambient light is not incident onto components of the LCD device.

The first and second light sensors 270 and 280 may be formed simultaneously or concurrently with the forming of the switching devices (i.e., TFTS) on the lower substrate 130.

Each of the first light sensor 270 and the second light sensor 280 includes a switching device (e.g., a TFT) designed so that a current flow through the switching device during the off state depends on an amount of light illuminated onto the first and second semiconductor layers 273 and 283. The first and second gate electrodes 271 and 281 are electrically connected to a sensor driving unit 290 through which a biasing off-voltage is applied along a conductive pattern via a data TCP 141.

The first and second source/drain electrodes 275, 275', 285, and 285' are connected to the conductive pattern via the data TCP 141 and are electrically connected to a comparing unit 291.

The comparing unit 291 compares voltages input from the first and second light sensors 270 and 280 which correspond to the amount of light incident on the first and second light sensors 270 and 280 respectively.

The comparing unit 291 is connected to a control unit 295 for controlling the drive of a backlight unit 150. When the input voltage from the first light sensor 270 is smaller than an input voltage from the second light sensor 280, the comparing unit 291 applies an ON control signal to the backlight unit 150 using the control unit 295. Upon receiving the ON control signal, an operation of the backlight unit is initiated or maintained so that the backlight emits light. On the other hand, when an input voltage of the first light sensor 270 is greater than an input voltage of the second light sensor 280, the comparing unit 291 applies an OFF control signal to the backlight unit 150 using the control unit 295.

Because the second light sensor 280 does not sense light when the backlight unit 150 is off, the comparing unit 291 may further include a storing part 293 for storing a last input voltage from the second light sensor 280 before to turning off the backlight unit 150 thus terminating an operation of the backlight unit so that the backlight unit does not emit light.

The storing part 293 supplies an input voltage to be used in place of the voltage from the second light sensor 280 for comparison with an input voltage of the first light sensor 270 during an off period of the backlight unit 150.

Alternatively in lieu of providing the storing part 293, a separate light source may be provided on a backside of the second light sensor 280 so that input voltages of the first and second light sensors 270 and 280 may be compared to each other even during an off period of the backlight unit 150.

The transflective LCD device according to the illustrated embodiment of the present invention provides a first light sensor 270 for sensing external light and a second light sensor 280 for sensing light from the backlight unit 150 formed with the switching devices (e.g., TFTs) of the lower substrate 130 to compare the external light with the light from the backlight unit 150 to thereby automatically control the backlight unit 150. Accordingly, the transflective LCD device may be automatically switched to one of a reflection mode and a transmission mode by automatic control of the backlight unit 150, so that the transflective LCD device does not need to be artificially manipulated by a user, and so that display quality may be maintained and power consumption may be reduced.

As described above, according to embodiments of the present invention, the first light sensor for sensing external light and the second light sensor for sensing light from the backlight unit are each provided on one side of the lower substrate of the LC display panel so that the backlight unit is automatically controlled by comparing the external light with the light from the backlight unit. Accordingly, the backlight unit is automatically switched into one of the reflective mode and the transmissive mode so that display quality is not degraded and so that power consumption may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a liquid crystal display panel including a first substrate divided into a display region and a non-display region including a first region and a second region, a liquid crystal layer, and a second substrate;
   a backlight unit disposed opposite a surface of the first substrate to emit light onto the liquid crystal display panel;
   a first sensor disposed in the first region to sense ambient light; and
   a second sensor disposed in the second region to sense light emitted from the backlight unit,
   wherein each of the first and second sensors includes a gate electrode, a semiconductor layer formed on the gate electrode and in which a current varies according to intensity of a light illuminated thereon and source and drain electrodes formed on the semiconductor layer,
   wherein a black matrix to block light is formed on the second substrate, the black matrix including an opening that corresponds to the first sensor to allow ambient light to be incident on the first sensor, the black matrix corresponding to the second sensor blocking the second sensor not to allow ambient light to be incident on the second sensor, and
   wherein the gate electrode of the second sensor includes an opening to allow light emitted by the backlight unit to be incident on the second sensor,
   wherein the gate electrode of the second sensor is directly contacted with the first substrate, the semiconductor layer of the second sensor is formed directly on the gate electrode and directly on the first substrate in an area corresponding to the opening of the gate electrode and the source electrodes and the drain electrodes of the second sensor are directly contacted with the semiconductor layer and the source electrodes and the drain electrodes are disposed in turns.

2. The liquid crystal display device according to claim 1, further comprising:
   a comparing unit that compares an output of the first sensor with an output of the second sensor to generate a comparison result; and
   a control unit that controls the backlight unit according to the comparison result.

3. The liquid crystal display device according to claim 2, wherein the control unit operates the backlight unit when the output of the first sensor is smaller than the output of the second sensor.

4. The liquid crystal display device according to claim 2, wherein the control unit terminates operation of the backlight unit when the output of the first sensor is larger than the output of the second sensor.

5. The liquid crystal display device according to claim 2, wherein a black matrix is formed on the non-display region.

6. The liquid crystal display device according to claim 1, further comprising a sensor driving unit that applies a biasing voltage to the gate electrodes of the first and second light sensors.

7. The liquid crystal display device according to claim 1, wherein the source and drain electrodes of the first and second sensors are connected to a comparing unit that compares an output of the first sensors with an output of the second sensors to generate a comparison result.

8. A method for driving a liquid crystal display device comprising:
   the liquid crystal display device includes a liquid crystal display panel including a first substrate divided into a display region and a non-display region including a first region and a second region, a liquid crystal layer, and a second substrate, a backlight unit disposed opposite a surface of the first substrate to emit light onto the liquid crystal display panel, a first sensor disposed in the first region to sense ambient light and a second sensor disposed in the second region to sense light emitted from the backlight unit,
   wherein each of the first and second sensors includes a gate electrode, a semiconductor layer formed on the gate electrode and in which a current varies according to intensity of a light illuminated thereon and source and drain electrodes formed on the semiconductor layer,
   wherein a black matrix to block light is formed on the second substrate, the black matrix including an opening that corresponds to the first sensor to allow ambient light to be incident on the first sensor, the black matrix corresponding to the second sensor blocking the second sensor not to allow ambient light to be incident on the second sensor,
   wherein the gate electrode of the second sensor includes an opening to allow light emitted by the backlight unit to be incident on the second sensor, and
   wherein the gate electrode of the second sensor is directly contacted with the first substrate, the semiconductor layer of the second sensor is formed directly on the gate electrode and directly on the first substrate in an area corresponding to the opening of the gate electrode and the source electrodes and the drain electrodes of the second sensor are directly contacted with the semiconductor layer and the source electrodes and the drain electrodes are disposed in turns,
   comparing an output of the first sensor with an output of the second sensor to generate a comparison result; and
   controlling the backlight unit according to the comparison result,
   wherein comparing an output of the first sensor with an output of the second sensor to generate a comparison result includes, and
   illuminating the second sensor with a light source when an operation of the backlight unit has been terminated.

9. The method according to claim 8, wherein controlling the backlight unit according to the comparison result includes:
   operating the backlight unit when the output of the first sensor is smaller than the output of the second sensor using a control unit.

10. The method according to claim 8, wherein controlling the backlight unit according to the comparison result includes:

terminating an operation of the backlight unit when the output of the first sensor is greater than the output of the second sensor using a control unit.

11. The method according to claim 8, wherein controlling the backlight unit according to the comparison result includes:
   controlling the backlight to operate the liquid crystal display device in a transmissive mode when the comparison result indicates that the output of the first sensor is smaller than the output of the second sensor.

12. The method according to claim 8, wherein controlling the backlight unit according to the comparison result includes:
   controlling the backlight to operate the liquid crystal display device in a reflective mode when the comparison result indicates that the output of the first sensor is greater than the output of the second sensor.

* * * * *